(12) United States Patent
Wu

(10) Patent No.: US 9,578,002 B2
(45) Date of Patent: *Feb. 21, 2017

(54) AUTHENTICATION DEVICE AND METHOD FOR ELECTRONIC ATOMIZATION DEVICE BASED ON MOBILE TERMINAL

(71) Applicant: SHENZHEN JIESHIBO TECHNOLOGY CO., LTD., Shenzhen, Guangdong (CN)

(72) Inventor: Jianyong Wu, Shenzhen (CN)

(73) Assignee: SHENZHEN JIESHIBO TECHNOLOGY CO., LTD., Shenzhen (CN)

(*) Notice: Subject to any disclaimer, the term of this patent is extended or adjusted under 35 U.S.C. 154(b) by 192 days.

This patent is subject to a terminal disclaimer.

(21) Appl. No.: 14/404,012

(22) PCT Filed: Aug. 15, 2014

(86) PCT No.: PCT/CN2014/084529
§ 371 (c)(1),
(2) Date: Nov. 26, 2014

(87) PCT Pub. No.: WO2016/023231
PCT Pub. Date: Feb. 18, 2016

(65) Prior Publication Data
US 2016/0269375 A1 Sep. 15, 2016

(51) Int. Cl.
*H04L 29/06* (2006.01)
*G06F 21/35* (2013.01)
*A24F 47/00* (2006.01)

(52) U.S. Cl.
CPC ............. *H04L 63/08* (2013.01); *A24F 47/002* (2013.01); *G06F 21/35* (2013.01); *H04L 63/0853* (2013.01)

(58) Field of Classification Search
CPC ................ H04L 63/083; H04L 63/0861; G06F 17/30876; H04W 12/06; H04W 88/02; H04W 4/008
See application file for complete search history.

(56) References Cited

U.S. PATENT DOCUMENTS

2006/0219776 A1* 10/2006 Finn ......................... B60R 25/25
235/380
2011/0103586 A1* 5/2011 Nobre ................. H04L 63/0853
380/270

(Continued)

*Primary Examiner* — Yonas Bayou

(57) ABSTRACT

Disclosed are an authentication device and an authentication method for electronic atomization device based on mobile terminal. The device includes a Bluetooth control module, an information transmission module, an information searching module, an information input module and a comparing and authenticating module. The authentication method includes steps of: building a Bluetooth connection between battery and mobile terminal; sending serial number of the battery to the mobile terminal after atomizer connects with the battery successfully; searching corresponding user identification information according to the serial number of the battery; receiving authentication information entered by user and carrying out an authentication by comparing the authentication information entered by user and the user identification information. By connecting the mobile terminal with electronic atomization device via Bluetooth and by using authentication device of the mobile terminal directly, authentication for the electronic atomization device can be achieved on the mobile terminal.

14 Claims, 2 Drawing Sheets

(56) References Cited

U.S. PATENT DOCUMENTS

| | | | |
|---|---|---|---|
| 2013/0340775 A1* | 12/2013 | Juster | H04L 67/42 |
| | | | 131/273 |
| 2014/0202477 A1* | 7/2014 | Qi | A24F 47/008 |
| | | | 131/329 |
| 2015/0075545 A1* | 3/2015 | Xiang | A24F 47/008 |
| | | | 131/329 |
| 2015/0288468 A1* | 10/2015 | Xiang | H04W 84/18 |
| | | | 455/500 |
| 2015/0304401 A1* | 10/2015 | Liu | A24F 47/008 |
| | | | 709/217 |
| 2016/0080469 A1* | 3/2016 | Liu | H04W 12/08 |
| | | | 709/219 |

\* cited by examiner

AUTHENTICATION DEVICE AND METHOD FOR ELECTRONIC ATOMIZATION DEVICE BASED ON MOBILE TERMINAL

FIELD OF THE INVENTION

The present invention relates to electronic atomization device and, in particular, it concerns an authentication device and method for electronic atomization device based on mobile terminal.

BACKGROUND OF THE INVENTION

Electronic atomization device, also called electronic cigarette, atomization tobacco with low temperature, is mainly used for reducing harm brought by smoking traditional cigarette. Its appearance and taste is similar to cigarette and it has more flavors than even normal cigarette do. It also can create a cloud, a taste and a feel that resembles cigarette. The electronic atomization device, which is composed of battery assembly and atomizer, is an imitative cigarette, and flavor components therein can be atomized into gas by atomization so that user can inhale it directly. The flavor components includes tobacco liquid, tobacco shred, tobacco powder, tobacco paste, fragrant slice, fragrant bar, liquid tobacco and so on.

Generally, electronic atomization device does not have a function of preventing being used by other people except the user itself, thus, it is easy to be used by some minors around the user, which brings an adverse effect on body and thought of the minors.

Some electronic atomization devices have a higher-cost authentication device to identify the identity of user, so as to prevent other people except the user itself from using the electronic atomization devices. The authentication device can be a password inputting module or a fingerprint reader and also can be a device with function of face recognition, pupil recognition or voice recognition and so on. However, the biggest problem with such electronic atomization device is that it has high cost because of: so many components need to be mounted into the electronic atomization device which has not big size originally, and the size of electronic atomization device needs to be controlled to be not too big, thus, both of the costs of components and installation are too high, thus, it will seriously influence market promotion of the electronic atomization devices.

SUMMARY OF THE INVENTION

An object of the present invention is to overcome the defects of the prior art by providing an authentication device and method for electronic atomization device based on mobile terminal, which can achieve a function of authentication for the use of the electronic atomization device at a lower cost.

To achieve the above object, there are provided following technical solutions:

An authentication device for electronic atomization device based on mobile terminal, which includes:

A Bluetooth control module, provided for building a Bluetooth connection between battery and mobile terminal;

An information transmission module, provided for sending serial number of the battery to the mobile terminal after atomizer connects with the battery successfully;

An information searching module, provided for searching corresponding user identification information according to the serial number of the battery;

An information input module, provided for receiving authentication information entered by user; and A comparing and authenticating module, provided for carrying out an authentication by comparing the authentication information entered by user and the user identification information.

Preferably, the device further includes an authentication control unit, which is provided for controlling the battery to wait for use instruction from user so as to supply power to the atomizer when the authentication is successful:

Preferably, the device further includes an authentication warning unit, which is provided for giving user a warning that the authentication is unsuccessful and controlling the battery not to supply power to the atomizer when the authentication is unsuccessful.

Preferably, the device further includes an initialization module, provided for receiving and storing original user identification information when the user identification information is blank.

Preferably, the initialization module is further used for sending the original user identification information to cloud server as a backup.

Preferably, the initialization module is further used for receiving user identity information entered by user and sending the user identity information to citizen database of corresponding nation, so as to verify the identity of user.

Preferably, the device further includes a verification warning module, provided for giving the user a warning that the verification is unsuccessful when the verification is unsuccessful.

Preferably, the authentication information is biometric identification information or character password information, the user identification information having the same type as the authentication information.

Furthermore, there is provided an authentication method for electronic atomization device based on mobile terminal, which includes following steps:

S1: building a Bluetooth connection between battery and mobile terminal;

S2: sending serial number of the battery to the mobile terminal after atomizer connects with the battery successfully;

S3: searching corresponding user identification information according to the serial number of the battery; and S4: receiving authentication information entered by user via mobile terminal; and S5: carrying out an authentication by comparing the authentication information entered by user and the user identification information.

Preferably, in the step S5, if the identification information of user is consistent with the user identification information, it means that the authentication is successful, and then the battery will be controlled to wait for use instruction from user so as to supply power to the atomizer.

Preferably, in the step S5, if the identification information of user is not consistent with the user identification information, it means that the authentication is unsuccessful, and then a warning that the authentication is unsuccessful will be given to user and the battery will be controlled not to supply power to the atomizer.

Preferably, between the step S3 and step S4, there is further provided a step of:

S3.1: receiving and storing original user identification information when the user identification information is blank and then returning to the step S3.

Preferably, in the step S3.1, there is further provided a step of: sending the original user identification information to cloud server as a backup simultaneously.

Preferably, in the step S3.1, there is further provided a step of: receiving user identity information entered by user and sending the user identity information to citizen database of corresponding nation, so as to verify the identity of user.

Preferably, in the step S3.1, if the authentication is unsuccessful, a warning that the authentication is unsuccessful will be given to user.

Preferably, the authentication information is biometric identification information or character password information, the user identification information having the same type as the authentication information.

Compared with the prior art, the present invention has beneficial effects as follows:

As disclosed in the present invention, by connecting the electronic atomization device with mobile terminal via Bluetooth and by using authentication device included in the mobile terminal directly, authentication for the electronic atomization device can be achieved on the mobile terminal, thereby reducing manufacturing cost of the electronic atomization device with achieving authentication, thus, it is advantageous for market promotion of the electronic atomization device with authenticating functionality.

DETAILED DESCRIPTION OF ILLUSTRATED EMBODIMENTS

For understanding the technical content of the present invention more sufficiently, now combine specific embodiments to introduce and illustrate the technical solution of the present invention as follows.

The First Embodiment

Figure 1:
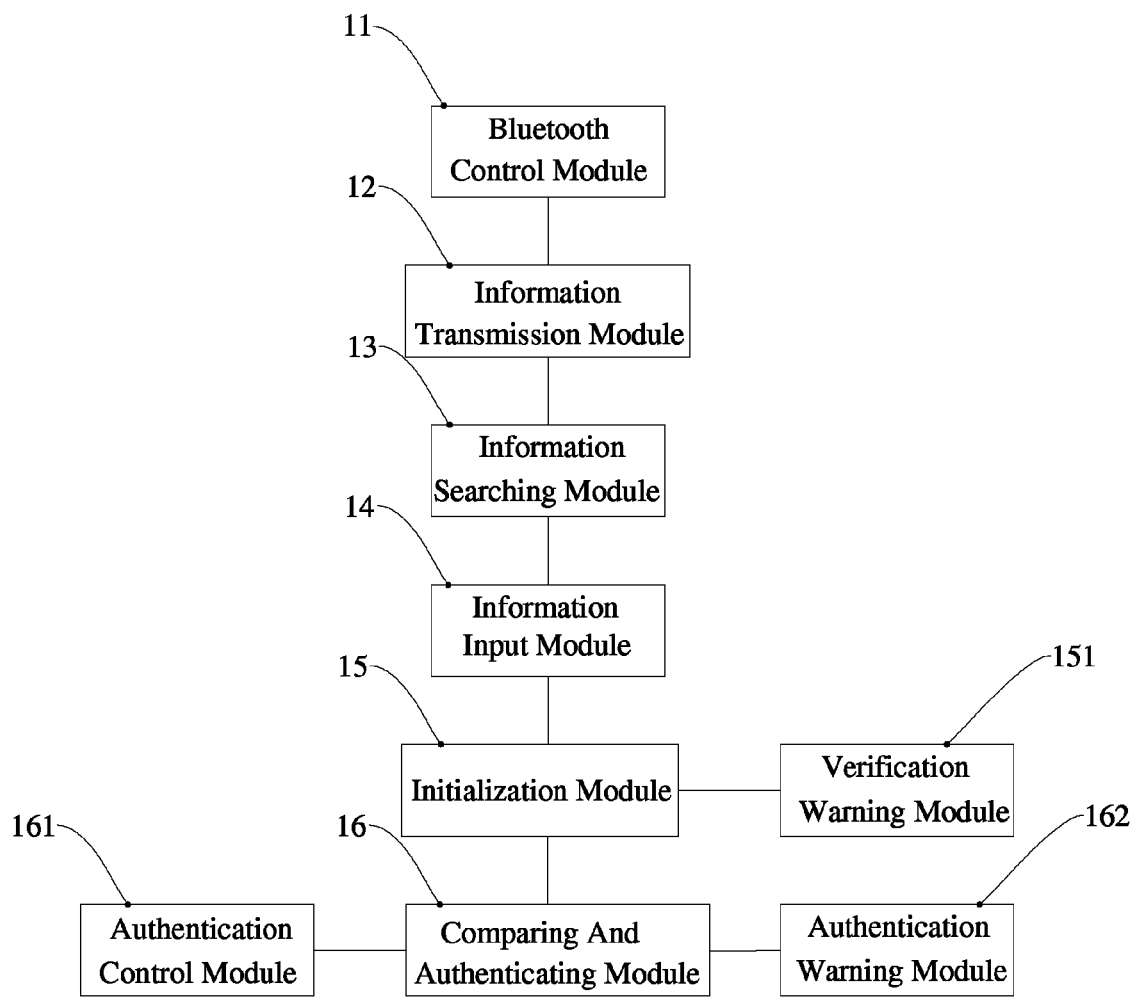
FIG. 1 is a system block diagram of an authentication device according to the present invention.

The authentication device for electronic atomization device based on mobile terminal, of which a system block diagram is shown in FIG. 1, includes following modules:

A Bluetooth control module 11, is provided for building a Bluetooth connection between battery and mobile terminal, the Bluetooth control module 11 firstly making the Bluetooth of the mobile terminal open, and then searching Bluetooth signal of the battery and trying to connect with the battery.

An information transmission module 12, is provided for sending serial number of the battery to the mobile terminal after the atomizer connecting with the battery successfully. After the atomizer connecting with the battery successfully, the information transmission module 12 will control the battery to send the serial number of battery to the mobile terminal via Bluetooth. The serial number of battery is a serial number of Bluetooth chip itself, which is uniquely corresponding to this Bluetooth chip, thus it also uniquely corresponds to this battery.

An information searching module 13, is provided for searching corresponding user identification information according to the serial number of the battery. In order to save cost, the user identification information is stored in the mobile terminal or cloud server instead of the battery. The user identification information is bound with the serial number of battery and stored both in the mobile terminal and the cloud server. After the mobile terminal receives the serial number from the battery, the information searching module 13 starts to search corresponding user identification information in the mobile terminal. If no user identification information can be found in the mobile terminal, the information searching module 13 will try to search it in the cloud server; and if no corresponding user identification information can be found in either the mobile terminal or the cloud server, it means that the user identification information is blank.

An information input module 14, is provided for receiving the authentication information entered by user. After the mobile terminal receives the user identification information from the battery via Bluetooth, if the user identification information is not blank, the information input module 14 will receive the authentication information entered by user.

A comparing and authenticating module 16, is provided for carrying out an authentication by comparing the authentication information entered by user and the user identification information. After the user enters the authentication information, the comparing and authenticating module 16 will compare the authentication information and the user identification information from the battery, and if they are the same, the authentication is successful.

An authentication control module 161, is provided for controlling the battery to wait for use instruction from user so as to supply power to the atomizer when the authentication is successful. When the authentication is successful, the authentication control module 161 will send an instruction that the authentication is successful to the battery and after receiving the instruction, the battery will wait for use instruction from user thereby supplying power to the atomizer. At this point, the user can smoke atomizer directly. The starting of the atomizer can be controlled by airflow sensor provided in the atomizer or controlled by switch button provided on the battery, and when using, the user needs to press the switch button for normal use.

An authentication warning module 162, is provided for giving user a warning that the authentication is unsuccessful and controlling the battery not to supply power to the atomizer when the authentication is unsuccessful. When the authentication is unsuccessful, the authentication warning module 162 will send an instruction that the authentication is unsuccessful to the battery and give a warning to user that the authentication is unsuccessful. On this condition, no matter the user how to operate the atomizer, the atomizer receives no power supply from the battery, thus the atomizer cannot work. The warning given to user that the authentication is unsuccessful can be achieved in many ways, such as by sending an instruction to make the battery twinkle, providing pop-up dialogs on the mobile terminal and making the screen blink and so on.

An initialization module 15, is provided for receiving and storing original user identification information when the user identification information is blank. The initialization module 15 starts to work after the mobile terminal searches user identification information, the initialization module 15 confirms whether the user identification information corresponding to the serial number of battery is blank, if it is blank, it means that the electronic atomization device is used for the first time, thus, the user needs to enter initial user identification information. After the initial user identification information being entered by user, the initialization module 15 will store the initial user identification information into the mobile terminal and make it be bound with the serial number of battery so as to facilitate next searching.

Additionally, the initialization module 15 is further used for sending original user identification information to cloud server as a backup. After the initial user identification information being entered by user, the initialization module 15 will send the initial user identification information to cloud server via wireless module of mobile terminal so as to back up the initial user identification information, thus, the user can directly find the initial user identification information in the cloud server when changing mobile terminal.

Additionally, the initialization module 15 is further used for receiving user identity information entered by user and sending the user identity information to citizen database of corresponding nation, so as to verify the identity of user. The user identity information includes real name, nationality, identification card number, date of birth of the user and so on. The initialization module 15 sends the user identity information to citizen database of corresponding nation according to the nationality information entered by the user, so as to verify the identity of user, and the main contents, which need to be verified, includes whether the identity information is real and whether it is meeting the requirement of age. If both of the two conditions are met, the user identity information will be stored into the cloud server of manufacturers.

A verification warning module 151, is provided for giving the user a warning that the verification is unsuccessful when the verification is unsuccessful. The initialization module 151 needs to send the user identity information entered by user to the citizen database so as to carry out verification. When the verification is unsuccessful, the cloud server will return the mobile terminal a message that the verification is unsuccessful and the verification warning module 151 will give the user a warning that the verification is unsuccessful.

If the verification for user identity information is successful, the initialization module 15 will build an account on the cloud server and the identity information related to the user and user identification information will be stored in this account.

The authentication information is biometric identification information or character password information, the user identification information having the same type as the authentication information. The biometric identification information includes fingerprint recognition information, face recognition information, pupil recognition information, and voice recognition information and so on.

In this embodiment, the authentication information is entered by user via mobile terminal, and in other embodiments, an input device can be provided to connect with the mobile terminal, by which the user can input authentication information, thereby achieving another way of authentication which cannot be achieved by the mobile terminal.

The user may have different needs at different times, for example, when at home where some juveniles are, the electronic atomization device needs to be set at a state that authentication process is needed every time the user uses it, and when on a business trip or other condition that no juveniles are, in order to use the electronic atomization device conveniently, the user prefers to make it work at a state that there is no need to carry out an authentication process every time the user uses it. Thus, in other embodiments, a switching module, by means of which user can choose whether carry out an authentication every time the user uses the electronic atomization device, can be added in the authentication device. After initializing the electronic atomization device, if corresponding user identification information can be found, the switching module will control the electronic atomization device to be capable of being used directly or call the authentication module to carry out an authentication according to the setting of user.

The Second Embodiment

Figure 2:
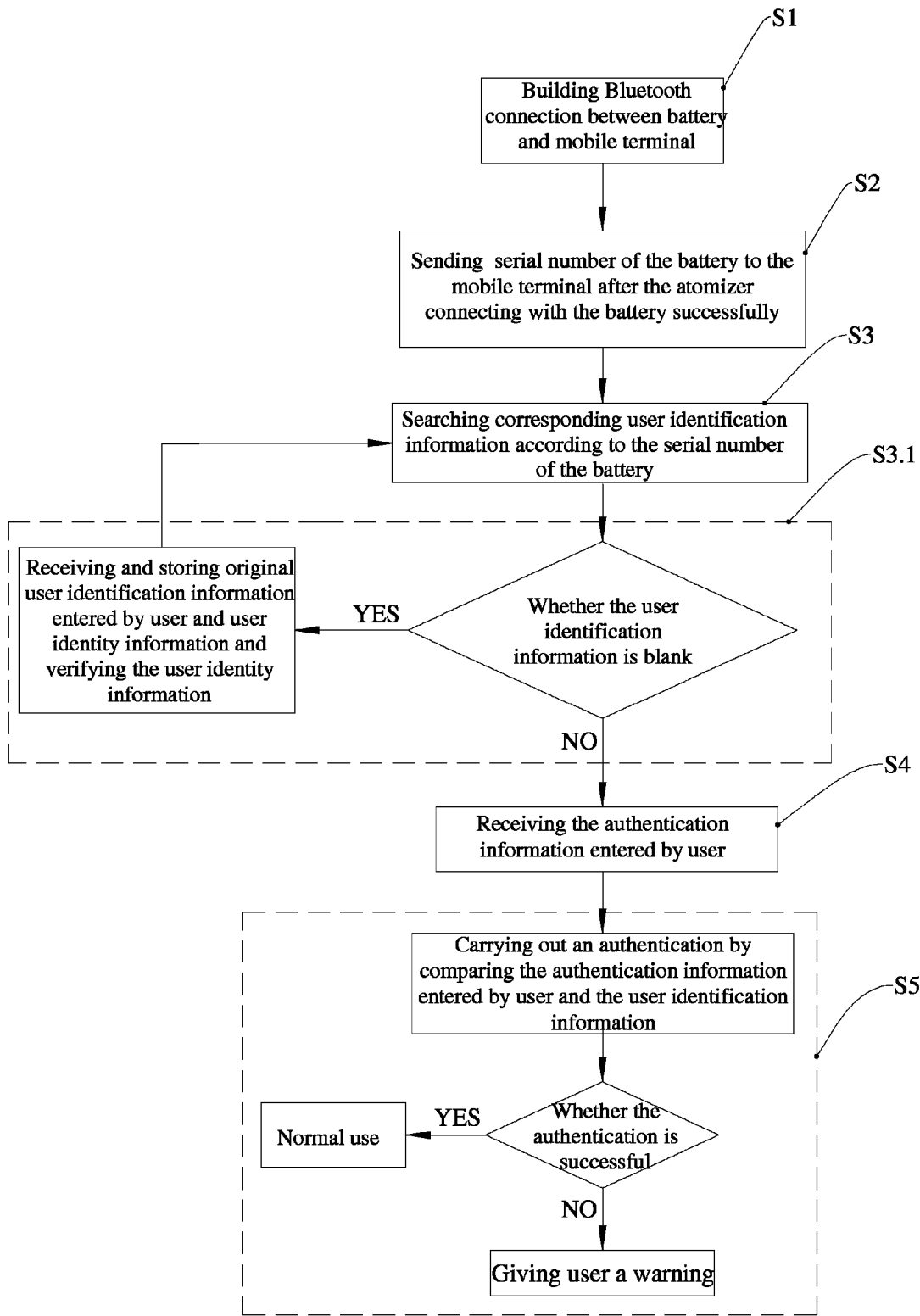
FIG. 2 is a flow chart of an authentication method according to the present invention.

The authentication method for electronic atomization device based on mobile terminal, of which a flowchart diagram is shown in FIG. 2, includes following steps:

Step S1: building a Bluetooth connection between battery and mobile terminal, the step S1 includes steps of opening Bluetooth of the mobile terminal and then searching Bluetooth signal of the battery and trying to connect with the battery.

Step S2: sending serial number of the battery to the mobile terminal after the atomizer connecting with the battery successfully, after the atomizer connecting with the battery successfully, the battery will send the serial number of battery to the mobile terminal via Bluetooth. The serial number of battery is a serial number of Bluetooth chip itself, which is uniquely corresponding to this Bluetooth chip, thus it also uniquely corresponds to this battery; and Step S3: searching corresponding user identification information according to the serial number of the battery. In order to save cost, the user identification information is stored in the mobile terminal or cloud server instead of the battery. The user identification information is bound with the serial number of battery and stored both in the mobile terminal and the cloud server. After the mobile terminal receives the serial number from the battery, begin to search corresponding user identification information in the mobile terminal. If no user identification information can be found in the mobile terminal, try to search it in the cloud server; and if no corresponding user identification information can be found in either the mobile terminal or the cloud server, it means that the user identification information is blank.

Step S3.1: receiving and storing original user identification information when the user identification information is blank and then returning to the step S3. After the mobile terminal searches user identification information, confirm whether the user identification information corresponding to the serial number of battery is blank, if it is blank, it means that the electronic atomization device is used for the first time, thus, the user needs to enter initial user identification information. After the initial user identification information being entered by user, the initialization unit will store the initial user identification information into the mobile terminal and make it be bound with the serial number of battery so as to facilitate next searching.

The step S3.1 further includes a step of: sending the original user identification information to cloud server as a backup, simultaneously. After initial user identification information being entered by user via mobile terminal, the initial user identification information will be sent to cloud server as a backup via wireless module of mobile terminal, thus, the user can directly find the initial user identification information in the cloud server when changing mobile terminal.

The step S3.1 further includes a step of: receiving user identity information entered by user and sending the user identity information to citizen database of corresponding nation, so as to verify the identity of user. The user identity information includes real name, nationality, identification card number, date of birth of the user and so on. Send the user identity information to citizen database of corresponding nation according to the nationality information entered by the user, so as to verify the identity of user, and the main contents, which need to be verified, includes whether the identity information is real and whether it is meeting the requirement of age. If both of the two conditions are met, the user identity information will be stored into the cloud server of manufacturers In the step S3.1, if the verification is unsuccessful, a warning that the verification is unsuccessful will be given to the user. When the verification is unsuccessful, the cloud server will return the mobile terminal a message that the verification is unsuccessful and a warning that the verification is unsuccessful will be provided to the user.

In the step S3.1, if the verification of user identity information is successful, an account will be built on the cloud server and the identity information related to the user and user identification information will be stored in this account.

Step S4: receiving the authentication information entered by user. The authentication information is biometric identification information or character password information, the user identification information having the same type as the authentication information. The biometric identification information includes fingerprint recognition information, face recognition information, pupil recognition information, and voice recognition information and so on.

Step S5: carrying out an authentication by comparing the authentication information entered by user and the user identification information. After the user enters the authentication information, the authentication information will be compared with the user identification information, and if they are the same, the authentication is successful.

Step 4: In the step S5, if the identification information of user is consistent with the user identification information, it means that the authentication is successful, and then the battery will be controlled to wait for use instruction from user so as to supply power to the atomizer. When the authentication is successful, an instruction that the authentication is successful will be sent to the battery, and after receiving the instruction, the battery will wait for use instruction from user thereby supplying power to the atomizer. At this point, the user can smoke atomizer directly. The starting of atomizer can be controlled by airflow sensor provided in the atomizer or controlled by switch button provided on the battery, and when using, the user needs to press the switch button for normal use.

In the step S5, if the identification information of user is not consistent with the user identification information, it means that the authentication is unsuccessful, and then a warning that the authentication is unsuccessful will be given to user and the battery will be controlled not to supply power to the atomizer. When the authentication is unsuccessful, an instruction that the authentication is unsuccessful will be sent to the battery and a warning that the authentication is unsuccessful will be given to user. On this condition, no matter the user how to operate the atomizer, the atomizer receives no power supply from the battery, thus the atomizer can not work. The warning given to user that the authentication is unsuccessful can be achieved in many ways, such as by sending an instruction to make the battery twinkle, providing pop-up dialogs on the mobile terminal and making the screen blink and so on. If the authentication is unsuccessful, user is prompted to enter authentication information again and then return to step S4, furthermore, it can impose the maximum times incorrect authentication information can be entered.

The user may have different needs at different times, for example, when at home where some juveniles are, the electronic atomization device needs to be set at a state that authentication process is needed every time the user uses it, and when on a business trip or other condition that no juveniles are, in order to use the electronic atomization device conveniently, the user prefers to make it work at a state that there is no need to carry out an authentication process every time the user uses it. Thus, in other embodiments, a step of switching, by means of which user can choose whether carry out an authentication every time the user uses the electronic atomization device, can be added in the authentication method. After initializing the electronic atomization device (entering initial user identification information and verifying identity information of user) and after searching the user identification information, if the user identification information is not blank, by means of the step of switching, the electronic atomization device will be controlled to be capable of being used directly or the step of comparing and authenticating (step S4 and step S5) will be called to carry out an authentication according to the setting of user.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An authentication device for electronic atomization device based on mobile terminal, comprising:
   a Bluetooth control module, provided for building a Bluetooth connection between battery and mobile terminal;
   an information transmission module, provided for sending serial number of the battery to the mobile terminal after atomizer connects with the battery successfully;
   an information searching module, provided for searching corresponding user identification information according to the serial number of the battery;
   an information input module, provided for receiving authentication information entered by user; and
   a comparing and authenticating module, provided for carrying out an authentication by comparing the authentication information entered by the user and the user identification information; wherein the authentication device further comprises:
   a switching module, the user chooses whether to carry out the authentication every time the user uses the electronic atomization device by the switching module; the switching module controls the electronic atomization device to be capable of being used directly or to carry out the authentication according to the choose of the user;
   an authentication control unit, which is provided for controlling the battery to wait for use instruction from the user so as to supply power to the atomizer when the authentication is successful; and
   an authentication warning unit, which is provided for giving the user a warning that the authentication is unsuccessful and controlling the battery not to supply power to the atomizer when the authentication is unsuccessful.

2. The authentication device for electronic atomization device based on mobile terminal according to claim 1, wherein the device further comprises:

an initialization module, provided for receiving and storing original user identification information when the user identification information is blank.

3. The authentication device for electronic atomization device based on mobile terminal according to claim 2, wherein said initialization module is further used for sending the original user identification information to cloud server as a backup.

4. The authentication device for electronic atomization device based on mobile terminal according to claim 2, wherein said initialization module is further used for receiving user identity information entered by the user and sending the user identity information to citizen database of corresponding nation, so as to verify the identity of user.

5. The authentication device for electronic atomization device based on mobile terminal according to claim 4, wherein the device further comprises: a verification warning module, provided for giving the user a warning that the verification is unsuccessful when the verification is unsuccessful.

6. The authentication device for electronic atomization device based on mobile terminal according to claim 1, wherein said authentication information is biometric identification information or character password information, the user identification information having the same type as the authentication information.

7. The authentication device for electronic atomization device based on mobile terminal according to claim 1, wherein starting of the atomizer is controlled by an airflow sensor provided in the atomizer.

8. The authentication device for electronic atomization device based on mobile terminal according to claim 1, wherein the authentication information is entered by the user via an input device provided to connect with the mobile terminal.

9. An authentication method for electronic atomization device based on mobile terminal, comprising following steps:
   S1: building a Bluetooth connection between battery and mobile terminal;
   S2: sending serial number of the battery to the mobile terminal after atomizer connects with the battery successfully;
   S3: searching corresponding user identification information according to the serial number of the battery; and
   S4: receiving authentication information entered by user via mobile terminal; and
   S5: carrying out an authentication by comparing the authentication information entered by the user and the user identification information; wherein the method further comprises:
   switching to chooses whether to carry out the authentication every time the user uses the electronic atomization device by the user; and controlling the electronic atomization device to be capable of being used directly or carrying out the authentication according to the choose of the user;
   in the step S5, if the identification information of user is consistent with the user identification information, it means that the authentication is successful and the battery will be controlled to wait for use instruction from the user so as to supply power to the atomizer; and if the identification information of user is not consistent with the user identification information, it means that the authentication is unsuccessful, and then a warning that the authentication is unsuccessful will be given to user and the battery will be controlled not to supply power to the atomizer.

10. The authentication method for electronic atomization device based on mobile terminal according to claim 9, wherein between the step S3 and step S4 there is further provided a step of:
   S3.1: receiving and storing original user identification information when the user identification information is blank and then returning to the step S3.

11. The authentication method for electronic atomization device based on mobile terminal according to claim 10, wherein in the step S3.1 there is further provided a step of: sending the original user identification information to cloud server as a backup simultaneously.

12. The authentication method for electronic atomization device based on mobile terminal according to claim 10, wherein in the step S3.1 there is further provided a step of: receiving user identity information entered by the user and sending the user identity information to citizen database of corresponding nation, so as to verify the identity of user.

13. The authentication method for electronic atomization device based on mobile terminal according to claim 12, wherein in the step S3.1 there is further provided a step of: giving user a warning that the authentication is unsuccessful when the authentication is unsuccessful.

14. The authentication method for electronic atomization device based on mobile terminal according to claim 9, wherein said authentication information is biometric identification information or character password information, the user identification information having the same type as the authentication information.

* * * * *